SELECTIVE CALLING SYSTEM

Filed Feb. 25, 1955 4 Sheets-Sheet 1

INVENTORS
IRVING F. BYRNES
MELVIN C. MYERS
& SCHIRMER G. ZETTLER
BY
[signature]
AGENT INVENTORS
IRVING F. BYRNES
MELVIN C. MYERS
& SCHIRMER G. ZETTLER
BY F. A. Rechif
AGENT INVENTORS
IRVING F. BYRNES
MELVIN C. MYERS
& SCHIRMER G. ZETTLER
BY
J. A. Rechif
AGENT Oct. 29, 1957 I. F. BYRNES ET AL 2,811,708

SELECTIVE CALLING SYSTEM

Filed Feb. 25, 1955 4 Sheets-Sheet 4

INVENTORS
IRVING F. BYRNES
MELVIN C. MYERS
& SCHIRMER G. ZETTLER
BY
F. A. Rechif
AGENT

United States Patent Office 2,811,708

Patented Oct. 29, 1957

2,811,708

SELECTIVE CALLING SYSTEM

Irving F. Byrnes, Riverdale, Melvin C. Myers, Jr., New York, and Schirmer G. Zettler, Bronx, N. Y., assignors to Radio Corporation of America, a corporation of Delaware

Application February 25, 1955, Serial No. 490,668

4 Claims. (Cl. 340—164)

Figure 1:
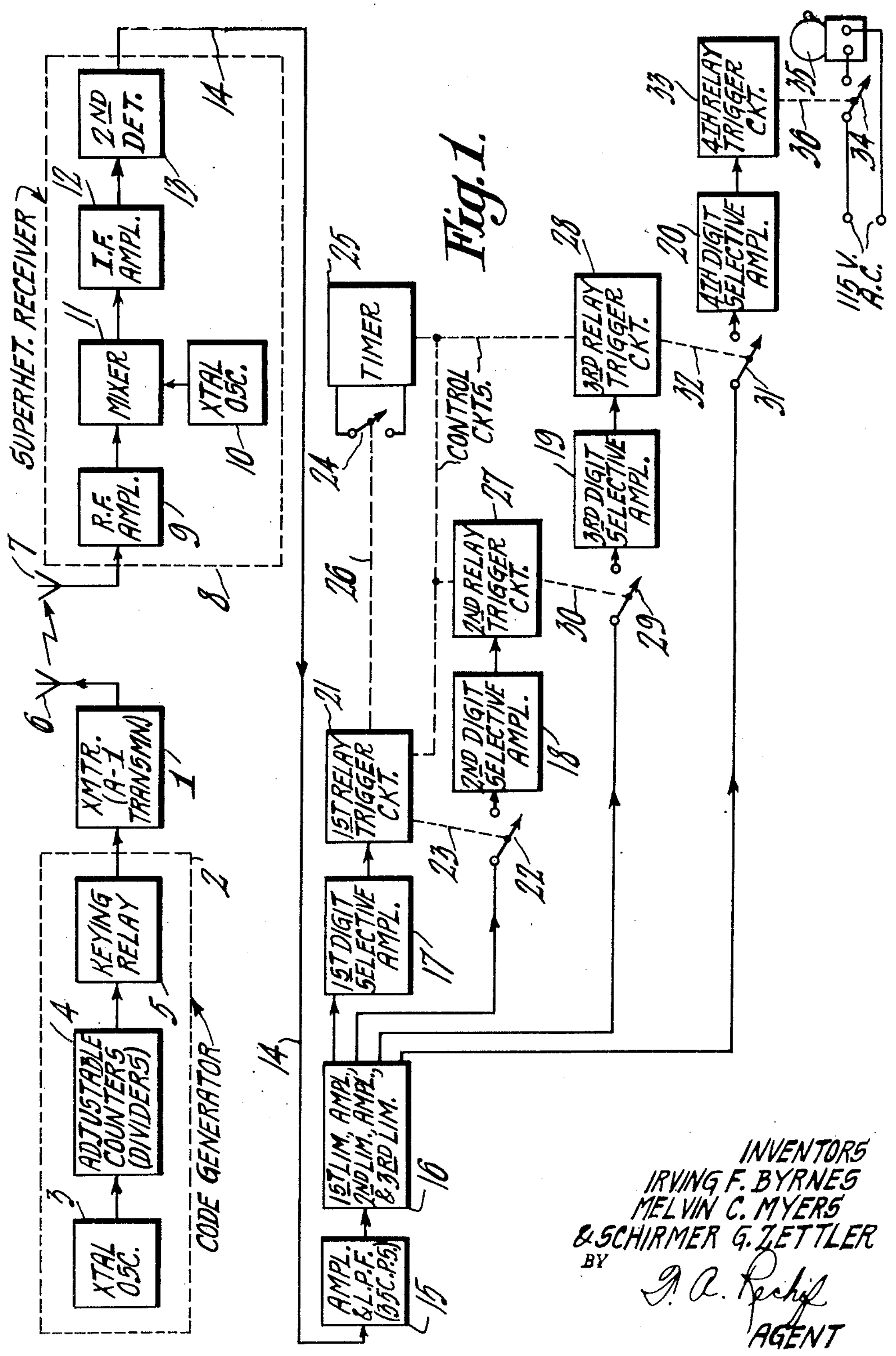

This invention relates to a selective calling system, and more particularly to a system for alerting a particular radio receiving position by sounding an alarm thereat, in response to coded signals radiated from a radio transmitter. The system of this invention finds particular application in the selective calling of ships from a shore station, although it can be used for selective calling, in general.

Various selective calling systems are known which are based on the amplitude modulation of the transmitted carrier by several audio frequency tones, either simultaneously or in succession, the frequencies of the tones used ranging from 100 to 3000 C. P. S. In such systems, the selective effect is produced at the receiver through the agency of a number of filters, tuned to the various tones. However, in certain situations amplitude modulation of the transmitter by audio frequencies is not permitted; in other situations the permissible bandwidth is too narrow for such service, it being realized that amplitude modulation by tones in the frequency range mentioned requires a fairly large transmitted bandwidth. Again, the transmitters are sometimes not designed for tone modulation. One or more of these objections applies to many coastal transmitters in the maritime service.

An object of this invention is to devise a novel selective calling system, in which only a very narrow bandwidth is required for transmission.

Another object is to devise a selective calling system in which the effects of selective fading are minimized.

A further object is to devise a novel selective calling system which does not require amplitude modulation or tone modulation of a transmitter.

The objects of this invention are accomplished, briefly, in the following manner: Broadly, the selective calling system of this invention is based on the on-off keying of a transmitter at low frequency rates. In order to transmit a call, the transmitter is on-off-keyed for a short interval at each of four keying rates in succession, the particular low frequency rates being selected in accordance with a code in order to alert a particular receiver. At the receiver, four electronic filters tuned to the desired transmitter keying rates are utilized, these filters (tunned amplifiers) being cascaded in such a way that receipt of the first frequency operates a relay coupled to the output of the first filter to connect the second filter into the circuit, receipt of the second frequency operates a relay coupled to the output of the second filter to connect the third filter into the circuit, and so on. When the four keying rates or frequencies set up for the particular receiver under consideration are received in the proper sequence, an alarm circuit is completed at the receiver to sound a signal bell. Also, receipt of the first frequency sets a timing circuit into operation. If for any reason a call is not completed in the allotted time, the timer opens all the relay circuits to restore the receiver to the condition for receiving a new call.

Figure 2A:
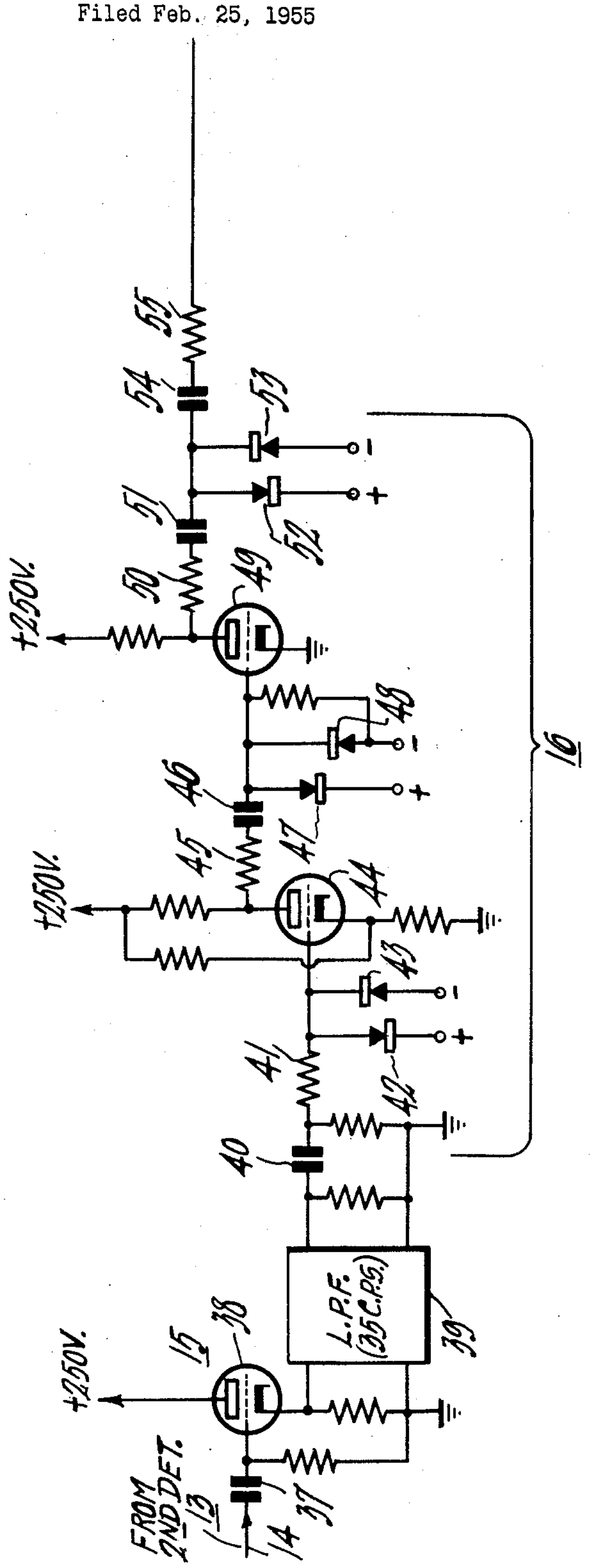
Figure 2B:
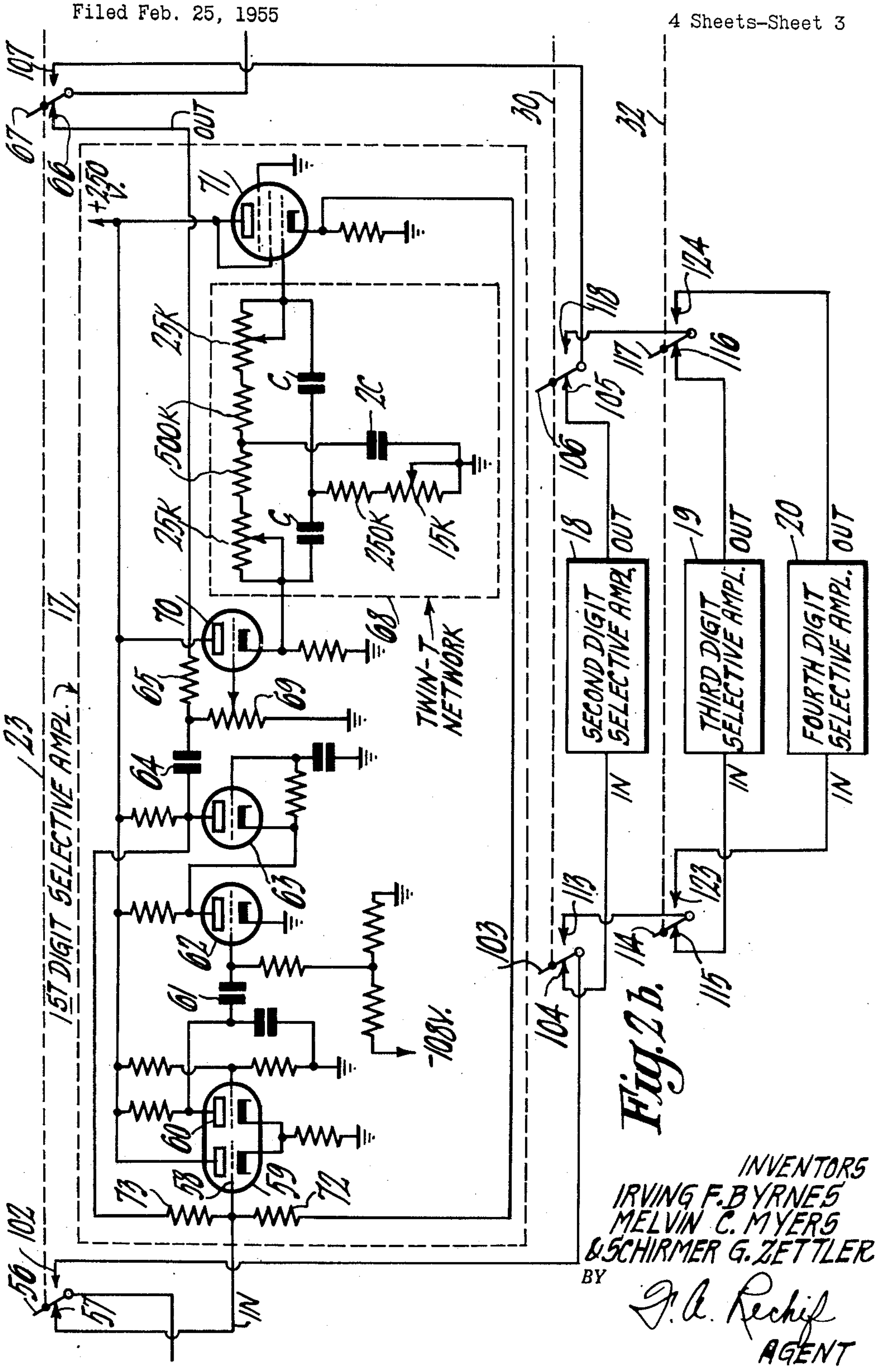
Figure 2C:
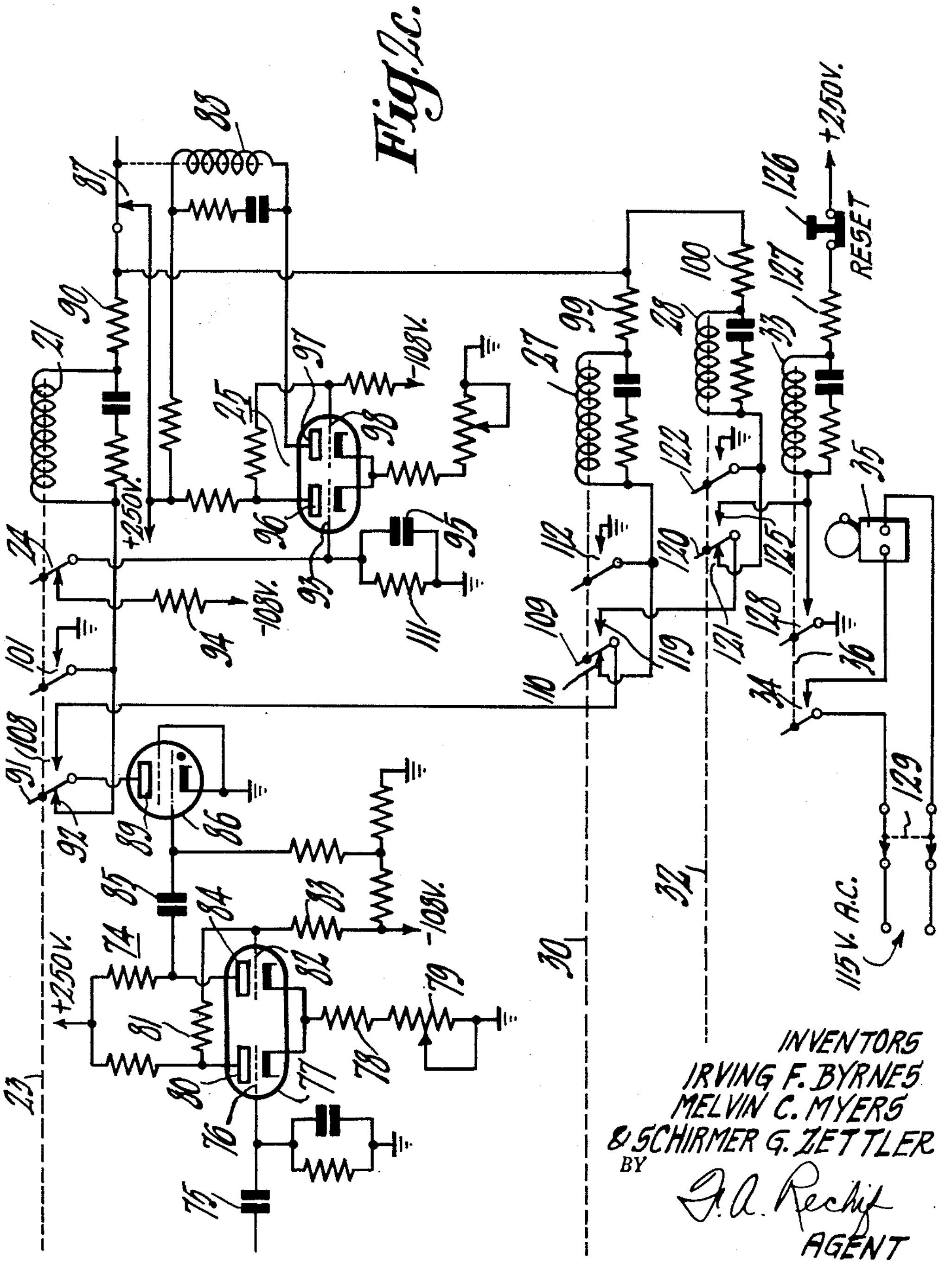

The foregoing and other objects of this invention will be better understood from the following description of an exemplification thereof, reference being had to the accompanying drawings, wherein:

Fig. 1 is a block diagram of a selective calling system according to this invention; and Fig. 2 is a detailed schematic of a portion of the selective calling system which is located at the receiving location.

Referring first to the block diagram of Fig. 1, in the selective calling system of this invention a fixed or calling radio station transmitter 1 is on-off-keyed (this form of keyed transmission being commonly termed A–1 emission) by a code generator 2 at various selectable rates in the range of 10 to 24 C. P. S. (cycles per second), for example. Code generator 2 will be hereinafter termed an encoder. Each ship to be called selectively is assigned a different four-digit code, each digit thereof corresponding to a specific on-off keying rate (of the transmitter) somewhere in the range of 10 to 24 C. P. S. This code is transmitted by keying the transmitter 1 at rates corresponding to the specific frequencies assigned to the four digits which make up the code. Therefore, each code transmission consists of a group of four on-off keying rates sent in succession. Thus, to call a certain ship, the several digits of that ship's code must be transmitted one at a time in the proper sequence, each for a fixed interval of time. By way of example, each of the aforesaid fixed intervals of time may be about one second, and since four digits are sent, the entire call may be transmitted in 4 to 4½ seconds or so, allowing time for switching from one frequency to another at the encoder. For a certain ship, a call might consist of a one-second-long train of on-off pulses, keyed on-off at 10.00 C. P. S., followed by a one-second-long train of on-off pulses, keyed on-off at 11.76 C. P. S., followed by a one-second-long train of on-off pulses, keyed on-off at 13.51 C. P. S., followed by a one-second-long train of on-off pulses, keyed on-off at 15.38 C. P. S. Although the four on-off keying rates given by way of example are all different, it is to be understood that two, three or even all four of them might be the same, if so required by the code of a particular ship called at a certain time.

In the encoder 2, the low frequency wave for keying the transmitter is derived from a piezo-electric crystal oscillator 3 through adjustable counters 4 which serve as frequency dividers, to provide at the output of component 4 a crystal-controlled low frequency wave (square wave) which is utilized through a keying relay 5 to on-off key the transmitter 1. The counters 4 are made adjustable to determine the particular on-off keying rates for the particular code transmitted.

One type of adjustable low frequency source for encoder 2 may include a 128-kc. crystal oscillator the output of which feeds the first of six cascaded binary counter stages the final output of which is a square wave with a repetition rate of 2000 C. P. S., followed by a further series of seven cascaded binary counters, the wave-forms from both anodes of each counter in this further series being fed to the grids of separate respective coincidence amplifiers the anodes of all of which are tied together. Certain outputs from these latter binary counters are selected by the action of the digit selector switches (four of the latter being provided, since a four-digit code is being utilized) which complete the cathode circuits of the desired coincidence amplifiers. If all the grids of the selected coincidence tubes go negative at the same time, an output pulse is produced which is fed back to the binary counters to "reset" them in order to repeat the process, and is also used to trigger another binary counter the output of which is a square wave at the desired (selected) low frequency rate; this latter wave is applied to keying relay 5 to key the transmitter 1. This arrangement of binary counters and coincidence tubes may be rather similar to that illustrated in Woodward Patent No. 2,523,244, dated September 19, 1950.

In the encoder 2, as previously stated, four digit selector switches are provided. In the code, eight digits corresponding to eight frequencies in the range of 10 to 24 C. P. S. are utilized, so that each wafer on the digit selector switches has eight positions, one for each of the eight division ratios necessary to obtain the eight corresponding frequencies. Only one of the selector switches is in the circuit at a time, and this is effected by means of a stepping switch, which operates to return the cathodes of the coincidence tubes to ground through the first, second, third and fourth digit selector switches in succession. The stepping switch in the encoder not only connects up the digit switches but it also provides the programming for the encoder unit. The operator need only set up the digit switches to the code of the ship he wishes to alert and then press another switch to put the encoder into operation. The stepping switch then moves into position to connect up the first digit selector switch. When the stepping switch is in this position, the keying relay 5 is on-off keying transmitter 1 at the rate called for by the first digit switch. A timer circuit is provided to determine the length of time the stepping switch remains in this first position; this timer is set for a length of time sufficient to energize a digit selective amplifier and associated relay in the ship's receiving equipment, to be hereinafter described in detail. At the end of this time interval, the stepping switch moves to the second position so that the second digit frequency may be transmitted, and so on until all the frequencies in the code have been transmitted.

Another type of adjustable low frequency source for encoder 2, which may be used from the point where the crystal frequency has been reduced to 2000 C. P. S. or 2 kc., utilizes cold cathode decade counting tubes, such as described for example in Electronics, November 1953, pages 138–141, in Electrical Engineering, September 1950, pages 810–813, in Electrical Engineering, December 1952, pages 1136–1139, or in Tele-Tech, December 1954, page 84. These tubes are neon-filled, have ten cathodes, and operate such that when triggered properly the neon glow will move from one cathode to the next for each pulse applied. Since the tube has ten cathodes, ten input pulses will cause the tube to return to its original state, and a single output pulse may then be taken to trigger a second decade counter tube. Outputs can be taken from any cathode, and since the two tubes operating in series provide a total count capacity of 100, any division ratio up to 100 may be obtained. A division ratio of 65 may be obtained, for example, by taking an output from the sixth cathode in the "tens decade" and the fifth cathode in the "units decade," and connecting these outputs to a reset gate tube. Then, when the count of 65 is reached, the gate tube will conduct, causing the counters to be reset to zero and at the same time feeding a pulse to the output binary counter the output of which is applied to keying relay 5 to key the transmitter 1.

To summarize, the encoder 2 provides a source of eight accurate digit frequencies, which makes available at the encoder output the four selected frequencies of a particular code in their proper sequence, and it keys radio transmitter 1 on and off at the rate of each selected digit frequency for the proper time duration.

First referring to Fig. 1, the on-off-keyed output of transmitter 1, which as previously stated is keyed at low frequency rates corresponding to digits of a selected code, is transmitted from a radiating antenna 6 through space, and is picked up by a radio receiving antenna 7. The transmitter 1, for example, may be on short, while the receiving antenna 7 and the receiver to be described may be located aboard a ship. The signals picked up by antenna 7 are applied to the input of a receiver 8 which is a conventional superheterodyne receiver including a radio frequency amplifier 9, a crystal heterodyne oscillator 10 feeding into a mixer 11, an intermediate frequency amplifier 12 and a second detector 13 provided with an output connection 14. Output connection 14 from the second detector of receiver 8 is coupled to the input of a high-gain amplifier and low pass filter unit 15. This combination of amplifier and low pass filter removes much of the high frequency noise power and its high gain brings weak signals up to the limiting level. The output of unit 15 is fed to the input of unit 16, wherein the signals are passed through a first limiter, another high-gain amplifier, a second limiter, another high-gain amplifier, and a third limiter. In this way, large variations in the input signals (60 db or more) can be handled and the output of the unit 16 is constant and essentially independent of input level, except for extremely weak input signals. In other words, the output signal of the unit 16, which is used as the input signal for the digit selective amplifiers 17, 18, 19 and 20 when certain switching is effected, is thus constant for all signals.

The output of the amplifier-limiter unit 16 is normally (i. e., in the normal unenergized position of a relay controlled by a first relay trigger circuit 21) fed to the input of the first digit selective amplifier 17, and is disconnected from the inputs of amplifiers 18, 19 and 20. In order to simplify illustration in Fig. 1, the unit 16 is shown as having four output connections. However, as will be explained hereinafter in connection with Fig. 2, unit 16 actually has only one output connection which is successively switched to the first, second, third and fourth digit selective amplifiers 17—20. Each of the amplifiers 17—20 is a selective or tuned amplifier which passes a signal only of the frequency to which it is tuned. Each of these amplifiers thus serves as a high-Q filter.

The detected signal out of the second detector 13, and at the output of unit 16, is of a frequency in the range of 10 to 24 C. P. S., the same as the particular on-off keying rate of transmitter 1 being transmitted at that time as part of the code transmission. The first, second, third and fourth digit selective amplifiers 17—20, respectively, are tuned to four frequencies corresponding to the four digits of a code, which would of course be different for each particular receiver (ship) adapted to be selectively alerted.

The output of the first digit selective amplifier 17 is applied to the first relay trigger circuit 21, which includes a gas tube Thyratron. If the signal from the unit 16 has a repetition rate (frequency) equal to the frequency to which the first digit amplifier 17 is tuned, the signal is passed by amplifier 17 and the resultant amplifier output fires the Thyratron in relay trigger circuit 21. A relay, the relay associated with the first relay trigger circuit 21, then is energized to disconnect the input of the first digit selective amplifier 17 from the output of unit 16 and to close a contact 22 between unit 16 and the second digit selective amplifier 18, thereby to connect the input of amplifier 18 to the output of unit 16. The mechanical connection between contact 22 and the first relay (in circuit 21) is indicated in Fig. 1 by the dotted line 23.

When the first relay (in circuit 21) is energized, it closes another contact 24 to put a timer circuit 25 into operation, the mechanical connection between contact 24 and the first relay being indicated by the dotted line 26. The function of the timer 25 is to keep the various selective amplifiers 18, 19 and 20 receptive only long enough for the completion of a call. If a call is not completed in the allotted time set up on timer 25 for any reason, for example if the code transmitted is not the one for which the particular receiver illustrated is set up, timer 25 operates and, by means of the various control circuits indicated by dotted lines so labeled in Fig. 1, opens the first relay 21, the second relay 27, and the third relay 28, if one or more of these relays has been previously operated, to set the circuits up for a new call. This arrangement will be described more in detail in connection with Fig. 2.

If the second digit of the transmitted group has the repetition rate (frequency) to which the second digit selective amplifier 18 is tuned, the signal is passed by amplifier 18 and in turn causes closure of another relay, the second relay of circuit 27, which is coupled to the output of amplifier 18. This second relay when energized disconnects the input of the second digit selective amplifier 18 from the output of unit 18 and closes a contact 29 between unit 16 and the third digit selective amplifier 19, thereby to connect the input of amplifier 19 to the output of unit 16. The mechanical connection between contact 29 and the second relay (in circuit 27) is indicated by dotted line 30.

If the third digit of the transmitted group has the repetition rate (frequency) to which the third digit selective amplifier 19 is tuned, the signal is passed by amplifier 19 and in turn causes closure of another relay, the third relay of circuit 28, which is coupled to the output of amplifier 19. This third relay when energized disconnects the input of the third digit selective amplifier 19 from the output of unit 16 and closes a contact 31 between unit 16 and the fourth digit selective amplifier 20, thereby to connect the input of amplifier 20 to the output of unit 16. The mechanical connection between contact 31 and the third relay (in circuit 28) is indicated by dotted line 32.

If the fourth digit of the transmitted group (it will be recalled that the transmitter is on-off-keyed at four low frequency rates in succession to constitute a code transmission) has the repetition rate (frequency) to which the fourth digit selective amplifier 20 is tuned, the signal is passed by amplifier 20 and in turn causes closure of another relay, the fourth relay of circuit 33, which is coupled to the output of amplifier 20. The closure of this fourth relay signifies that a call has been completed, since in order for this fourth relay to close it is necessary that all four of the frequencies to which amplifiers 17–20 are tuned be received in the proper sequence. This fourth relay when energized closes a contact 34 between a source of power (for example, a 115-volt alternating current supply) and an alarm 35, sounding this alarm. The mechanical connection between contact 34 and the fourth relay (in circuit 33) is indicated by dotted line 36. Thus, the transmission of the proper four frequencies from transmitter 1 by on-off keying this transmitter at selected low frequency rates, one at a time in proper sequence to constitute a code, results in alerting the particular ship's receiver of Fig. 1 by sounding alarm 35.

Now referring to Fig. 2, which is a schematic circuit diagram of a portion of the selective calling system located at the receiving location, the output connection 14 from the second detector 13 of the receiver is coupled through a capacitor 37 to the grid of a vacuum triode 38 connected as a cathode follower amplifier the output of which is applied to the input of a low pass filter 39 which passes frequencies below 35 C. P. S. but stops frequencies above that value. The output of filter 39 is applied through a capacitor 40 and a resistor 41 to the first limiter in unit 16, which limiter comprises a pair of crystal diodes 42 and 43 connected in opposition and suitably biased to act as a full-wave limiter. The limited signal is fed to the grid of a vacuum triode 44 connected to act as a high-gain amplifier, and the output of this amplifier is applied by way of a resistor 45 and a capacitor 46 to a second limiter, which comprises a pair of crystal diodes 47 and 48 connected in opposition and suitably biased to act as a full-wave limiter. The further limited signal is fed to the grid of a vacuum triode 49 connected to act as a high-gain amplifier, and the output of this amplifier is applied by way of a resistor 50 and a capacitor 51 to a third limiter, which comprises a pair of crystal diodes 52 and 53 connected in opposition and suitably biased to act as a full-wave limiter.

The signal as limited by the third limiter constitutes the output of unit 16, and this signal is fed through a capacitor 54 and a resistor 55 to the movable arm 56 of a relay-operated switch which is normally closed on its left contact 57 as shown. Arm 56 is operated by the first relay 21 through mechanical connection 23.

With arm 56 on contact 57 as shown, a signal circuit is completed between the output of unit 16 and the "In" lead of the first digit selective amplifier 17, so that the signal output of unit 16 is fed to the input of amplifier 17 when relay 21 is unenergized. All of the amplifiers 17, 18, 19 and 20 are exactly the same, circuitwise, so that only amplifier 17 is illustrated in detail, the amplifiers 18, 19 and 20 being illustrated merely by means of boxes. The amplifier 17—20 are tuned to predetermined low frequencies in accordance with a code and they differ from each other, if at all, only in the values of the components in their respective frequency-selective networks.

Each of the amplifiers 17—20 is a feedback amplifier utilizing a twin-T network, and provides a high-Q filter which passes a signal only of the frequency to which it is tuned. Looking at amplifier 17, with relay 21 in the unenergized position shown, the low frequency signal output of unit 16 is fed to the first grid 58 of a dual triode vacuum tube 59 the two stages of which are connected as a cathode-coupled amplifier the output of which is taken from the second anode 60 and applied through a coupling capacitor 61 to the grid of a triode electron discharge device structure 62 connected as a grounded-cathode amplifier, and from the anode of this latter structure the signal is fed to the cathode of another triode electron discharge device structure 63 connected as a grounded-grid amplifier stage. The output of the amplifier 17 is taken from the anode of structure 63 and applied through a capacitor 64 and a resistor 65 to the "Out" lead of amplifier 17 and thence to a contact 66 normally engaged by the movable arm 67 of a relay-operated switch which is also operated by the first relay 21.

In the amplifier 17 a large amount of gain is required, yet the signal must have only 180° phase change. For this reason, a grounded-grid amplifier is used at 63, and a cathode-coupled amplifier at 59.

The tuned digit selective amplifier 17 is a degenerative feedback amplifier using a twin-T network 68 in the feedback path. Feedback is effected by applying a portion of the amplifier output by way of a potentiometer 69 ("Q" control) to the grid of a vacuum triode 70 connected as a cathode follower amplifier, and applying the output signal from tube 70 through a resistance-capacitance twin-T network 68 to the grid of another cathode follower vacuum tube 71 the output of which is applied through a resistor 72 to the input or first grid 58 of the amplifier tube 59. The characteristics of network 68 are such that there is no transmission therethrough at the tuned frequency and maximum transmission therethrough at frequencies removed from the tuned frequency. Then, because of the transmission characteristics of this network, maximum degenerative feedback is applied to the input tube 59 at frequencies removed from the tuned frequency and no feedback at the tuned frequency.

In such an amplifier as amplifier 17, the selectivity is a function of the loop gain from the output of network 68 to the input of this same network, i. e. the gain from the control grid of the tube 71 around through the amplifier to the cathode of tube 70. Therefore, another feedback path is provided to stabilize this gain. This feedback is applied from the anode of tube 63 through a resistor 73 to grid 58. In the selective system of this invention, the gain must be held constant for the following reason. When the frequency to which the network 68 is tuned is applied to the input of the digit selective amplifier 17, maximum output is obtained at the anode of tube 63 and the trigger amplifier 74 (which is adapted to be coupled successively to the outputs of the digit selective amplifiers 17, 18, 19 and 20) is adjusted to trigger for this output. Unwanted frequencies, on the other hand, will not produce enough output to trigger amplifier 74 and thus discrimination against undesired signals is obtained. Thus, it is apparent that the gain of each of the digit amplifiers 17—20 must be constant. The outputs of the selective amplifiers 17—20 are equal to the gains of the respective amplifiers times the input signal. Since the output voltage must be maintained constant for reasons previously explained, it is obvious that the input voltage must be constant for all signals, so limiters such as those in unit 16 are mandatory.

The constants for the various twin-T networks 68 in the amplifiers 17—20 may be determined from the following table, wherein the frequencies are the eight low digit frequencies which may be selectively utilized at the transmitter for on-off keying, and the C values are those for the C in network 68.

| Frequency (C. P. S.): | C (mmfd.) |
|---|---|
| 10.00 | 31050 |
| 11.76 | 26400 |
| 13.51 | 22980 |
| 15.38 | 20180 |
| 17.54 | 17700 |
| 19.23 | 16150 |
| 21.28 | 14600 |
| 23.26 | 13350 |

Due to the high Q of the selective amplifiers 17—20, the system of this invention has a high rejection of all frequencies except the ones to which the amplifiers are tuned, and thus the probability of false calls is greatly reduced. Furthermore, the fact that all incoming signals are limited to a particular level means that the interfering capabilities of strong signals with rates close to the desired frequencies are very much diminished.

A single, common trigger amplifier 74 is used, which is adapted to be successively connected to the outputs of each of the digit selective amplifiers 17, 18, 19 and 20. When the relay 21 is unenergized, arm 67 is in engagement with contact 66, to connect the output of the first digit selective amplifier 17 to trigger circuit 74. Arm 67 is connected through a capacitor 75 to the first grid 76 of a dual triode 77 the two structures of which are cathode-coupled in a so-called Schmitt trigger circuit. The cathodes of the two structures of device 77 are connected to ground through a common resistor 78 and a common potentiometer 79. The anode 80 of the first triode structure is connected through a resistor 81 to the grid 82 of the second triode structure, while this latter grid is connected through a resistor 83 to a negative potential point on a power supply voltage divider.

The trigger amplifier 74 is a highly regenerative circuit that will trip at a definite and sharply defined grid voltage level. This level is determined by the circuit constants and it can be adjusted over a limited range through the use of the cathode potentiometer 79. The first triode of tube 77 (including anode 80, grid 76, and the corresponding cathode) is cut off when grid 76 is below the tripping level; then, the second triode (including anode 84, grid 82, and the corresponding cathode) draws a large amount of anode current. When a signal of sufficient amplitude is supplied to the input grid 76 such that the tripping level is reached, the input (first) triode begins to conduct and starts a regenerative cycle that ends in the output (second) triode being cut off. This produces a large positive signal on the anode 84, the duration of which depends upon the length of time that the input grid voltage (voltage on grid 76) is maintained at or above the tripping level.

Trigger amplifier output is taken from the anode 84 of the second triode structure, and applied through a capacitor 85 to the control grid of a relay thyratron 86. The contacts 87 of a relay 88 are normally closed, because this relay is normally energized, and the closure of contacts 87 supplies positive potential to the anode 89 of thyratron 86 from +250 v. through a resistor 90, the winding of relay 21, and contact 92 and movable arm 91 of relay 21.

The timer circuit 25 is a slight modification of the so-called Schmitt trigger circuit. With relay 21 unenergized as shown (its normal position), minus "B" voltage is applied to the input grid 93 of the dual-triode timer circuit 25 through a resistor 94 and contacts 24 of relay 21. The one-mfd. capacitor 95 in the grid circuit charges to this value and consequently the first triode including anode 96, grid 93 and the corresponding cathode is cut off and the second triode including anode 97, grid 98 and the corresponding cathode is conducting heavily. The anode current of the second triode energizes relay 88, the winding of which is in circuit with the anode 97, closing contacts 87 and thereby connecting positive potential +250 v. to relays 21, 27 and 28 through the respective resistors 90, 99 and 100. This is the normal condition of the circuit, the state that the circuit is in prior to the reception of any calls, relay 88 being energized and relays 21, 27, 28 and 33 all being unenergized.

The second, third and fourth digit selective amplifiers 18, 19 and 20 are all exactly the same, circuitwise, as the first selective amplifier 17 previously described, and are tuned to certain of the low frequencies in the table given above, according to a predetermined code. That is, all of the digit selective amplifiers 17—20 are tuned to pass certain frequencies according to a predetermined code for each particular ship or receiver.

With the relays all in the "normal" or original position illustrated, the low frequency output of unit 16 is applied to the input of amplifier 17, the output of amplifier 17 is applied to the input of trigger amplifier 74, and anode potential is applied to thyratron 86 through the winding of relay 21. If the first digit frequency received by the receiver of Fig. 2 is of the proper value (the frequency to which amplifier 17 is tuned), amplifier 17 produces output which, applied to trigger circuit 74, trips the same to cause the first half of dual triode 77 to conduct and to cause the second half of this dual triode to be cut off, producing an increase of positive potential at anode 84 which fires thyratron 86, energizing first relay 21 the winding of which is in the anode circuit of thyratron 86. Before any other contacts on relay 21 moves, the normally-open contacts 101 close (this is a mechanical arrangement on relay 21 and these contacts are called a preliminary make contact) to provide a ground return for the relay (thus completing a holding circuit and maintaining it energized) and to at the same time extinguish the thyratron 86 by removing anode voltage therefrom, so that it will be ready for the next digit frequency.

Immediately following the closure of contacts 101, the three relay-operated arms 56, 67 and 91 move to their energized positions. This disconnects the input of amplifier 17 from the output of unit 16 and connects the input of the second digit selective amplifier 18 to the output of unit 16, through arm 56, now closed on contact 102, and arm 103 of relay 27, normally closed on contact 104. Arm 67 now disconnects the output of amplifier 17 from the input of trigger circuit 74 (thus removing the input grid voltage from this circuit and causing it to revert to its original condition, with the first triode cut off and the second triode conducting) and connects the output of amplifier 18 to the input of trigger circuit 74, through contact 105 normally engaged by arm 106 of relay 27, and contact 107, now engaged by arm 67. Also, arm 91 disconnects the thyratron anode 89 from relay 21 and connects it to relay 27, through arm 91, now closed on contact 110.

Now, with relay 21 energized the second digit selective amplifier 18 is connected into the circuit. If the second digit frequency received is of the value to which amplifier 18 is tuned, amplifier 18 produces output which, applied to trigger circuit 74, trips the same to consequently fire thyratron 86 and energize second relay 27. When second relay 27 is energized, the contacts 112 close to provide a ground return for this relay (completing a holding circuit therefor), and to extinguish the thyratron 86 by removing the anode voltage therefrom. Following this, the three relay-operated arms 103, 106 and 109 move to their energized positions. This disconnects the input of amplifier 18 from the output of unit 16 and connects the input of the third digit selective amplifier 19 to the output of unit 16, through arm 56, now closed on contact 102, arm 103, now closed on contact 113, and arm 114 of relay 28, normally closed on contact 115. Arm 106 now disconnects the output of amplifier 18 from the input of trigger circuit 74 and connects the output of amplifier 19 to the input of trigger circuit 74, through contact 116 normally engaged by arm 117 of relay 28, contact 118, now engaged by arm 106, and contact 107, now engaged by arm 67. Also, arm 109 disconnects thyratron anode 89 from relay 27 and connects it to relay 28, through arm 91, now closed on contact 108, arm 109, now closed on contact 119, and arm 120 of relay 28, normally closed on contact 121.

Now, with relays 21 and 27 both energized, the third digit selective amplifier 19 is connected into the circuit. If the third digit frequency received is of the value to which amplifier 19 is tuned, amplifier 19 produces output which, applied to trigger circuit 74, trips the same to consequently fire thyratron 86 and energize third relay 28. When third relay 28 is energized, the contacts 122 close to provide a ground return for this relay (completing a holding circuit therefor), and to extinguish the thyratron 86 by removing the anode voltage therefrom. Following this, the three relay-operated arms 114, 117 and 120 move to their energized positions. This disconnects the input of amplifier 19 from the output of unit 16 and connects the input of the fourth digit selective amplifier 20 to the output of unit 16, through arm 56, now closed on contact 102, arm 103, now closed on contact 113, and arm 114, now closed on contact 123. Arm 117 now disconnects the output of amplifier 19 from the input of trigger circuit 74 and connects the output of amplifier 20 to the input of trigger circuit 74, through contact 124, now engaged by arm 117, contact 118, now engaged by arm 106, and contact 107, now engaged by arm 67. Also, arm 120 disconnects the thyratron anode 89 from relay 28 and connects it to relay 33, through arm 91, now closed on contact 108, arm 109, now closed on contact 119, and arm 120, now closed on contact 125. Positive potential +250 v. is continuously applied to relay 33 (except when "Reset" switch 126, normally closed, is depressed) through switch 126 and a resistor 127.

Now, with relays 21, 27 and 28 all energized, the fourth digit selective amplifier 20 is connected into the circuit. If the fourth digit frequency received is of the value to which amplifier 20 is tuned, amplifier 20 produces output which, applied to trigger circuit 74, trips the same to consequently fire thyratron 86 and energize fourth relay 33. When fourth relay 33 is energized, the contacts 128 close to provide a ground return for this relay, thus completing a holding circuit for the same and maintaining it energized. Following this, the normally-open contacts 34 of relay 33 are closed. This completes an energizing circuit for the alarm 35 from the 115-volt A. C. source (provided the double-pole single-throw line switch 129 is closed) through the now closed contacts 34, sounding the alarm 35 and completing the call by alerting the particular receiver illustrated. Relay 33 being locked in directly from the +250 v. source through its contacts 128, once it is energized, this relay can be deenergized only by pressing the "Reset" switch 126 to break the circuit. Thus, the alarm 35 will continue to sound until the reset button 126 is depressed.

When the first relay 21 is energized its normally-closed contacts 24 open, disconnecting the timing capacitor 95 in the grid circuit of timer 25 from the charging source. This capacitor then begins to discharge through the 1.2-megohm resistor 111 in parallel therewith. The potential on the timer grid 93 follows the normal RC discharge curve from the minus "B" level up toward ground potential or zero. When this grid potential reaches the tripping level, the timer circuit 25 trips as previously described to cause the first triode structure 93, 96 etc. to conduct and the second triode structure 97, 98 etc. to cut off. This deenergizes relay 88, which is in circuit with anode 97, opening its contacts 87 to remove the positive potential +250 v. from all of the relays 21, 27 and 28. This will deenergize any of these relays which may have been previously energized, by opening their holding circuits.

The time that the grid capacitor 95 will take to discharge to the triggering level for circuit 25 is adjusted to allow enough time for the last three transmitted digits of the four digit code to be received, it being remembered that this grid capacitor begins to discharge when the first digit is received, that is, when relay 21 is energized. In the event a completed call (all four digit frequencies to which amplifiers 17—20 are tuned) is not received in the prescribed time, the equipment is automatically reset for a new call, by deenergizing any of the relays 21, 27 or 28 which may have been previously energized. If the call is completed, relay 33 is energized, as previously described, and an alarm sounded, and in this case all the relays 21, 27 and 28 are returned to their normal (unenergized) state by the timer. Relay 33 then can be deenergized only by pressing the "Reset" button 126.

In the system of this invention, emission is held to a narrow bandwidth, due to the low frequencies used for on-off keying (10–24 C. P. S., for example). Also, the effects of selective fading are minimized. Since the information used at the receiver is not a function of signal amplitude but instead is a function of signal frequency, the signals can be limited very close to the noise level, by the limiters in unit 16.

What is claimed is:

1. In a selective calling system, means for keying a transmitter on and off at a plurality of selected rates one at a time in sequence to provide a sequence of on-off pulse trains constituting a code, and a receiving station comprising a plurality of frequency selective devices each tuned to pass a predetermined one of said selected keying rates, said devices being arranged in sequence in accordance with a particular predetermined code for said receiving station, controllable means normally connecting the input of the first of said devices to the detected output of a radio receiver, said last-mentioned means being operable to disconnect the input of the first device from said detected output and to connect the input of the second of said devices to such detected output, a single trigger circuit having an input and operating to develop a control potential in response to the application of a signal voltage to its input, controllable means normally connecting the output of the first device to the trigger circuit input, said last-mentioned means being operable to disconnect the output of the first device from the trigger circuit input and to connect the output of the second device to such input, and means responsive to the appearance of said control potential for operating both the first-mentioned controllable means and the second-mentioned controllable means.

2. In a selective calling system, means for keying a transmitter on and off at four selected rates one at a time in sequence to provide a sequence of four on-off pulse trains constituting a code, and a receiving station comprising first, second, third and fourth frequency selective devices each tuned to pass a predetermined one of said selected keying rates, said devices being arranged in sequence in accordance with a particular predetermined code for said receiving station, first controllable means normally connecting the input of said first device to the detected output of a radio receiver, said first means being operable to disconnect the input of said first device from said detected output and to connect the input of said second device to such detected output, a single trigger circuit having an input and operating to develop a control potential in response to the application of a signal voltage to its input, second controllable means normally connecting the output of said first device to the trigger circuit input, said second means being operable to disconnect the output of said first device from the trigger circuit input and to connect the output of said second device to such input, means responsive to the appearance of said control potential for operating both said first and said second means, third controllable means operable to disconnect the input of said second device from said detected output and to connect the input of said third device to such detected output, fourth controllable means operable to disconnect the output of said second device from the trigger circuit input and to connect the output of said third device to such input, means responsive to the appearance of said control potential for operating both said third and said fourth means, fifth controllable means operable to disconnect the input of said third device from said detected output and to connect the input of said fourth device to such detected output, sixth controllable means operable to disconnect the output of said third device from the trigger circuit input and to connect the output of said fourth device to such input, means responsive to the appearance of said control potential for operating both said fifth and said sixth means, seventh controllable means operable to close an alarm circuit, and means responsive to the appearance of said control potential for operating said seventh means.

3. In a selective calling system, means for keying a transmitter on and off at four selected rates one at a time in sequence to provide a sequence of four on-off pulse trains constituting a code, and a receiving station comprising first, second, third and fourth frequency selective devices each tuned to pass a predetermined one of said selected keying rates, said devices being arranged in sequence in accordance with a particular predetermined code for said receiving station, first controllable means normally connecting the input of said first device to the detected output of a radio receiver, said first means being operable to disconnect the input of said first device from said detected output and to connect the input of said second device to such detected output, a single trigger circuit having an input and operating to develop a control potential in response to the application of a signal voltage to its input, second controllable means normally connecting the output of said first device to the trigger circuit input, said second means being operable to disconnect the output of said first device from the trigger circuit input and to connect the output of said second device to such input, means responsive to the appearance of said control potential for operating both said first and said second means, third controllable means operable to disconnect the input of said second device from said detected output and to connect the input of said third device to such detected output, fourth controllable means operable to disconnect the output of said second device from the trigger circuit input and to connect the output of said third device to such input, means responsive to the appearance of said control potential for operating both said third and said fourth means, fifth controllable means operable to disconnect the input of said third device from said detected output and to connect the input of said fourth device to such detected output, sixth controllable means operable to disconnect the output of said third device from the trigger circuit input and to connect the output of said fourth device to such input, means responsive to the appearance of said control potential for operating both said fifth and said sixth means, a timing circuit operative at the end of a predetermined time interval following energization thereof to return each of the first through sixth means to unoperated condition, means responsive to the appearance of said control potential for energizing said circuit concomitantly with the operation of said first and second means, seventh controllable means operable to close an alarm circuit, and means responsive to the appearance of said control potential for operating said seventh means.

4. In a selective calling system, means for keying a transmitter on and off at four selected rates one at a time in sequence to provide a sequence of four on-off pulse trains constituting a code, and a receiving station comprising first, second, third and fourth frequency selective devices each tuned to pass a predetermined one of said selected keying rates, said devices being arranged in sequence in accordance with a particular predetermined code for said receiving station, first controllable means comprising contacts operated by a first relay for normally connecting the input of said first device to the detected output of a radio receiver, said first means being operable to disconnect the input of said first device from said detected output and to connect the input of said second device to such detected output, a single trigger circuit having an input and operating to develop a control potential in response to the application of a signal voltage to its input, second controllable means comprising additional contacts operated by said first relay for normally connecting the output of said first device to the trigger circuit input, said second means being operable to disconnect the output of said first device from the trigger circuit input and to connect the output of said second device to such input, said control potential energizing said first relay to operate both said first and said second means, third controllable means comprising contacts operated by a second relay to disconnect the input of said second device from said detected output and to connect the input of said third device to such detected output, fourth controllable means comprising additional contacts operated by said second relay to disconnect the output of said second device from the trigger circuit input and to connect the output of said third device to such input, said control potential energizing said second relay to operate both said third and said fourth means, fifth controllable means comprising contacts operated by a third relay to disconnect the input of said third device from said detected output and to connect the input of said fourth device to such detected output, sixth controllable means comprising additional contacts operated by said third relay to disconnect the output of said third device from the trigger circuit input and to connect the output of said fourth device to such input, said control potential energizing said third relay to operate both said fifth and said sixth means, a timing circuit operative at the end of a predetermined time interval following energization thereof to return each of the first through sixth means to unoperated condition, means responsive to the appearance of said control potential for energizing said circuit concomitantly with the operation of said first and second means, and seventh controllable means comprising contacts operated by a fourth relay to close an alarm circuit, said control potential energizing said fourth relay to operate said seventh means.

References Cited in the file of this patent

UNITED STATES PATENTS

| | | |
|---|---|---|
| 2,497,656 | Clarke | Feb. 14, 1950 |
| 2,591,937 | Herrick | Apr. 8, 1952 |
| 2,600,405 | Hoeppner | June 17, 1952 |
| 2,712,128 | Woodruff | June 28, 1955 |